(No Model.)
J. W. BENNETT.
FARM GATE.
No. 327,992. Patented Oct. 13, 1885.
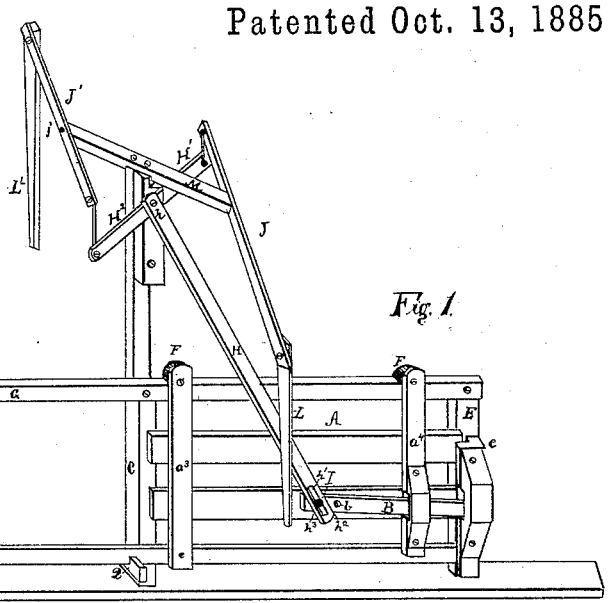
Fig. 1
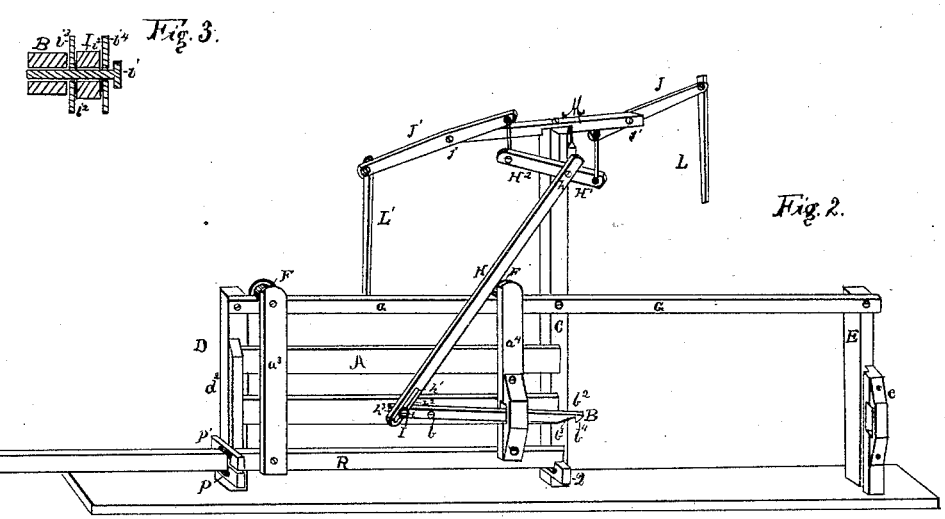
Fig. 3.
Fig. 2.
Witnesses
F. M. Clarke
S. H. F. Clarke
Inventor
Jackson W. Bennett.
By Seward A. Haseltine & Bro.
Attorneys.
N. PETERS, Photo-Lithographer, Washington, D. C.

UNITED STATES PATENT OFFICE.

JACKSON W. BENNETT, OF CARTHAGE, MISSOURI.

FARM-GATE.

SPECIFICATION forming part of Letters Patent No. 327,992, dated October 13, 1885.

Application filed April 28, 1885. Serial No. 163,702. (No model.)

*To all whom it may concern:*

Be it known that I, JACKSON W. BENNETT, a citizen of the United States, residing at Carthage, in the county of Jasper and State of Missouri, have invented certain new and useful Improvements in Farm-Gates; and I do hereby declare the following to be a full, clear, and exact description of the invention, such as will enable others skilled in the art to which it appertains to make and use the same.

My invention relates to improvements in farm-gates, the object of which is to provide a cheap, simple, convenient, and durable device, which may be easily opened and closed in passing through without alighting from a horse or vehicle, and also to provide a gate that may be opened part way or entirely, and then closed from either side without approaching the gate. These objects I attain by means of the device illustrated in the accompanying drawings, forming a part of this specifiation, in which—

Figure 1 is a view in elevation of the entire device closed. Fig. 2 is a view in elevation of the device as opened. Fig. 3 is a section of the roller at the end of the latch.

Similar letters of reference indicate corresponding parts in the several figures.

A is a gate of any desired size and shape, provided with a latch, B, which is pivoted by a bolt, $b$, or other suitable means, to the gate. Said latch has a suitable catch or head, $b^2$, formed by the slanting edge $b^3$ and point $b^4$.

I is a roller attached in any desired way to the back end of the latch, preferably by a bolt, $i$. Said roller has a groove, $i^2$, to receive the body of the T-lever. For this purpose large washers $i^3$ $i^4$ may be used, as shown in Fig. 3. The end pieces, $a^3$ $a^4$, of the gate are made long, and provided with rollers F F at the upper ends, to run upon a connecting-piece, G, which is attached to the posts D C E, or, preferably, upon a cleat or attached piece or strip, by means of castings, which enables the rollers to run above, while the ends of the pieces $a^3$ $a^4$ run beneath it, thus preventing its getting out of place at the top.

R is a strip or piece secured to the bottom of the gate and extending back, so that when closed the piece will still rest between the pieces P P' Q, for holding and guiding the gate. The pieces P P' Q may have rollers to enable the gate to slide more freely in case of wind, &c., and these rollers may be secured in any desired way.

Posts D E have projections or cleats $d^2$ $e$ to stop the gate when entirely opened or closed.

H H' H² is a lever, T-shaped, having a bolt, $h$, or other suitable pivot fastening to the upper part of the middle post, C. Said lever has a slot, $h'$, at or near the lower end of the long part or body, to receive and work on the roller I.

J J' are levers pivoted to the ends of a cross-piece, M, which may be secured to or near the top of the post C at any angle desired. The ends of this cross-piece are beveled, so as to turn the levers J J' in any desired direction. Said levers are pivoted by bolts $j$ $j'$, or other suitable means, to the ends of the cross-piece M.

L L' are handles secured pendent from the levers to operate them.

The piece M may be placed high enough to admit a load of hay or covered vehicles.

The device is operated thus: When closed, as shown in Fig. 1, it may be operated by raising on handle L or pulling on handle L'. The attached lever moves the T-lever, so that the side $h^2$ of the slot presses down and back on the roller I, which raises the latch by turning it on the pivot-bolt $b$. This unlatches the gate, and the backward force moves the gate back on its rollers any desired distance. Then by pulling down on the handle L, or by raising on the handle L', the gate is moved forward, and as it is closed the part $h^3$ of the side of the slot raises up the back end of the latch B and catches it in the desired place. The gate may also, when desired, be operated by hand, as any ordinary gate.

Having thus described my invention, what I claim as new, and desire to secure by Letters Patent, is—

The combination, with a sliding gate, of a T-shaped lever having a slot, $h'$, a latch, B, having a pivot, $b$, and roller I, a long piece, R, posts D C E, connecting-piece G, cross-piece M, and pivoted levers J J', having handles L L', all substantially as and for the purpose set forth.

In testimony whereof I affix my signature in presence of two witnesses.

JACKSON W. BENNETT.

Witnesses:
ALFRED J. CRANDALL,
WILLIAM J. DORRIS.